US009652220B2

(12) United States Patent
Tammam et al.

(10) Patent No.: US 9,652,220 B2
(45) Date of Patent: May 16, 2017

(54) ZERO DOWN-TIME DEPLOYMENT OF NEW APPLICATION VERSIONS

(71) Applicant: SAP Portals Israel Ltd, Ra'anana (IL)

(72) Inventors: Ariel Tammam, Ramat-Gan (IL); Gadi Melamed, Givat Shmuel (IL)

(73) Assignee: SAP Portals Israel Ltd., Ra'anana (IL)

( * ) Notice: Subject to any disclaimer, the term of this patent is extended or adjusted under 35 U.S.C. 154(b) by 0 days.

(21) Appl. No.: 14/708,862

(22) Filed: May 11, 2015

(65) Prior Publication Data
US 2016/0335079 A1 Nov. 17, 2016

(51) Int. Cl.
*G06F 9/44* (2006.01)
*G06F 9/445* (2006.01)
*G06F 17/30* (2006.01)

(52) U.S. Cl.
CPC ............ *G06F 8/67* (2013.01); *G06F 8/65* (2013.01); *G06F 8/71* (2013.01); *G06F 17/30345* (2013.01)

(58) Field of Classification Search
CPC ................ G06F 8/60–8/71; G06F 17/30345
See application file for complete search history.

(56) References Cited

U.S. PATENT DOCUMENTS

| | | | |
|---|---|---|---|
| 6,801,230 B2 | 10/2004 | Driskell | |
| 7,051,285 B1 | 5/2006 | Harrison et al. | |
| 7,085,994 B2 | 8/2006 | Gvily | |
| 7,478,382 B2 * | 1/2009 | Menahemi | G06F 8/67 717/168 |
| 7,810,107 B2 | 10/2010 | Banker et al. | |
| 7,836,410 B2 | 11/2010 | Vignet | |
| 7,908,557 B2 | 3/2011 | Schrepp et al. | |
| 8,117,529 B2 | 2/2012 | Melamed et al. | |
| 8,127,249 B2 | 2/2012 | Deggelmann et al. | |
| 8,146,013 B2 | 3/2012 | Bhogal et al. | |
| 8,266,544 B1 | 9/2012 | Kay et al. | |
| 8,276,059 B2 | 9/2012 | Busse et al. | |

(Continued)

OTHER PUBLICATIONS

Serdar Tasiran, Runtime Refinement Checking of Concurrent Data Structures, 2004, pp. 163-175.*

(Continued)

*Primary Examiner* — Thuy Dao
*Assistant Examiner* — Mongbao Nguyen
(74) *Attorney, Agent, or Firm* — Fish & Richardson P.C.

(57) ABSTRACT

The disclosure generally describes methods, software, and systems, including a method for application versioning. An updated version of a software component to be executed by an application is received while an instance of the application is executing using an instance of a current version. The updated version is stored with new version information, concurrently with the current version. A request is received for execution of the application that uses the software component. Invoking logic in the application is updated to invoke the software component. The updating includes modifying the invoking logic to invoke the updated version using the updated version information in the invoking logic. The updating causes the invoking logic to invoke, at run-time, the updated version. Instances of the application invoked prior to the receiving and storing continue to execute using the current version. The application is provided for execution, including the updated invoking logic.

17 Claims, 3 Drawing Sheets

(56) References Cited

U.S. PATENT DOCUMENTS

| | | | |
|---|---|---|---|
| 8,667,417 B1 | 3/2014 | Goodger et al. | |
| 8,782,632 B1* | 7/2014 | Chigurapati | G06F 8/65 717/168 |
| 9,280,338 B1* | 3/2016 | Stickle | G06F 8/65 |
| 2002/0080186 A1 | 6/2002 | Frederiksen | |
| 2004/0210890 A1* | 10/2004 | Armstrong | G06F 8/67 717/168 |
| 2007/0006201 A1* | 1/2007 | Axnix | G06F 9/44521 717/162 |
| 2007/0150833 A1 | 6/2007 | Kim et al. | |
| 2008/0098046 A1* | 4/2008 | Alpern | G06F 17/30306 |
| 2008/0127090 A1* | 5/2008 | Best | G06F 8/71 717/122 |
| 2008/0295025 A1 | 11/2008 | Gyure et al. | |
| 2008/0301663 A1* | 12/2008 | Bahat | G06F 8/67 717/170 |
| 2011/0088046 A1 | 4/2011 | Guertler et al. | |
| 2011/0137909 A1 | 6/2011 | Guertler et al. | |
| 2011/0209133 A1* | 8/2011 | Mahajan | G06F 8/43 717/170 |
| 2011/0271222 A1 | 11/2011 | Cho | |
| 2011/0271270 A1* | 11/2011 | Bowen | G06F 8/67 717/171 |
| 2011/0283256 A1* | 11/2011 | Raundahl Gregersen | G06F 8/67 717/108 |
| 2012/0072867 A1 | 3/2012 | Schlegel | |
| 2013/0055232 A1* | 2/2013 | Rajan | G06F 8/67 717/170 |
| 2013/0086483 A1 | 4/2013 | Vainer et al. | |
| 2013/0086495 A1 | 4/2013 | Guzansky et al. | |
| 2013/0091132 A1 | 4/2013 | Khalatov et al. | |
| 2013/0091456 A1 | 4/2013 | Sherman et al. | |
| 2013/0132420 A1 | 5/2013 | Vainer et al. | |
| 2013/0139081 A1 | 5/2013 | Alon et al. | |
| 2013/0144957 A1 | 6/2013 | Sherman et al. | |
| 2013/0145006 A1 | 6/2013 | Tammam | |
| 2013/0159280 A1 | 6/2013 | Soshin | |
| 2013/0159926 A1 | 6/2013 | Vainer et al. | |
| 2013/0167072 A1 | 6/2013 | Ari et al. | |
| 2013/0332917 A1* | 12/2013 | Gaither | G06F 8/67 717/170 |
| 2013/0346957 A1* | 12/2013 | Khandelwal | G06F 8/67 717/170 |
| 2014/0033191 A1* | 1/2014 | Ward | G06F 8/71 717/170 |
| 2014/0068588 A1* | 3/2014 | Tan | G06F 8/67 717/169 |
| 2014/0101644 A1* | 4/2014 | Buzaski | G06F 17/30174 717/168 |
| 2014/0114913 A1* | 4/2014 | Engelko | G06F 17/30079 707/609 |
| 2014/0123020 A1 | 5/2014 | Bleier et al. | |
| 2014/0351807 A1* | 11/2014 | Wen | H04L 67/02 717/173 |
| 2014/0372981 A1* | 12/2014 | Said | G06F 9/44505 717/121 |
| 2014/0380297 A1* | 12/2014 | Madl, III | G06F 8/67 717/171 |
| 2015/0020058 A1* | 1/2015 | Cao | G06F 8/65 717/170 |
| 2015/0143354 A1* | 5/2015 | Mathew | G06F 8/67 717/170 |
| 2015/0378714 A1* | 12/2015 | Katariya | G06F 8/65 717/170 |
| 2016/0085777 A1* | 3/2016 | Engelko | G06F 17/30345 707/803 |
| 2016/0162277 A1* | 6/2016 | Fenzl | G06F 8/67 717/170 |

OTHER PUBLICATIONS

David Simpson, DB2 for z/OS Native SQL Procedures: User Experiences in Implementation, 2011, pp. 1-36.*
Santosh Kakade, Maintaining Stored Procedures in Database Application, 2012, pp. 1-5.*
U.S. Appl. No. 13/534,737, filed Jun. 27, 2012, Tammam et al.
U.S. Appl. No. 13/535,565, filed Jun. 28, 2012, Alexey Soshin.
U.S. Appl. No. 13/535,619, filed Jun. 28, 2012, Alexey Soshin.
U.S. Appl. No. 13/541,557, filed Jul. 3, 2012, Vainer et al.
U.S. Appl. No. 13/546,825, filed Jul. 11, 2012, Yahali Sherman.
U.S. Appl. No. 13/549,996, filed Jul. 16, 2012, Alexey Soshin.
U.S. Appl. No. 13/660,698, filed Oct. 25, 2012, Bleier et al.
U.S. Appl. No. 13/760,300, filed Feb. 6, 2013, Ebner et al.
U.S. Appl. No. 13/795,892, filed Mar. 12, 2013, Ebner et al.
U.S. Appl. No. 13/796,108, filed Mar. 12, 2013, Tkach et al.
U.S. Appl. No. 13/904,238, filed May 29, 2013, Alexey Soshin.
U.S. Appl. No. 13/927,721, filed Jun. 26, 2013, Tkach et al.
U.S. Appl. No. 13/973,460, filed Aug. 22, 2013, Alexey Soshin.

* cited by examiner

ZERO DOWN-TIME DEPLOYMENT OF NEW APPLICATION VERSIONS

BACKGROUND

The present disclosure relates to execution of applications.

Applications that are available in the cloud can be executed, for example, after selection by a user through a portal or in other ways. When an application executes, the application may use stored procedures, e.g., that are invoked by the application and various ones of the stored procedures that the application invokes. Over time, stored procedures may change. Due to a change in a stored procedure, for example, an application may perform in a different way when a new version of a stored procedure is introduced. Typically, a data base or other structure can store current versions of a stored procedure used by applications. In addition to stored procedures, other types of software components may exist, each of which being able to change over time, such as when a new version is released.

SUMMARY

The disclosure generally describes computer-implemented methods, software, and systems for generating executable components. For example, an updated version of a software component to be executed by an application is received. The updated version of the software component is received while an instance of the application is executing using an instance of a current version of the software component. The updated version of the software component is stored with new version information. The updated version is stored concurrently with the current version of the software component. A request for execution of the application that uses the software component is received after storing the updated version of the software component. Invoking logic in the application is updated responsive to the receiving. The invoking logic is configured to invoke the software component. The updating includes modifying the invoking logic to invoke the updated version of the software component using the updated version information in the invoking logic. The updating causes the invoking logic to invoke, at run-time, the updated version of the software component. Instances of the application, e.g., that were invoked prior to the receiving and storing of the updated version, continue to execute using the current version of the software component. The application, including the updated invoking logic, is provided for execution.

The present disclosure relates to computer-implemented methods, software, and systems for generating executable components. One computer-implemented method includes: receiving an updated version of a software component to be executed by an application, where the updated version of the software component is received while an instance of the application is executing using an instance of a current version of the software component; storing the updated version of the software component with new version information, wherein the updated version is stored concurrently with the current version of the software component; receiving a request for execution of the application that uses the software component after storing the updated version of the software component; updating, responsive to the receiving, invoking logic in the application, the invoking logic configured to invoke the software component, wherein the updating includes modifying the invoking logic to invoke the updated version of the software component using the updated version information in the invoking logic, the updating causing the invoking logic to invoke, at run-time, the updated version of the software component, and wherein instances of the application invoked prior to the receiving and storing of the updated version continue to execute using the current version of the software component; and providing the application, including the updated invoking logic, for execution.

The foregoing and other implementations can each optionally include one or more of the following features, alone or in combination. In particular, one implementation can include all the following features:

In a first aspect, combinable with any of the previous aspects, updating the invoking logic includes concatenating a name of the software component with a string representing the new version information.

In a second aspect, combinable with any of the previous aspects, updating the invoking logic includes replacing a name of the software component in the invoking logic with a new name of the software component associated with the updated version information.

In a third aspect, combinable with any of the previous aspects, the version information includes one or more of version identifiers selected from a group comprising a timestamp, a version number, a test/production indicator, and a development path identifier.

In a fourth aspect, combinable with any of the previous aspects, the method further includes, determining that the instances of the application invoked prior to the receiving and storing of the updated version using the current version of the software component are no longer executing and deleting, disabling, or archiving the current version of the software component, based on the determining.

In a fifth aspect, combinable with any of the previous aspects, the software component is a stored procedure.

In a sixth aspect, combinable with any of the previous aspects, the stored procedure has multiple versions, each with different version information, and the method further comprises: managing the multiple versions of the stored procedure to prevent an occurrence of consistency issues associated with the multiple versions; and supporting development of applications using a name of the software component without a developer knowledge of version information.

In a seventh aspect, combinable with any of the previous aspects, the software component is a method, a procedure, or a subroutine.

In an eighth aspect, combinable with any of the previous aspects, the updated version of a software component and the current version of the software component are stored in a common database.

The subject matter described in this specification can be implemented in particular implementations so as to realize one or more of the following advantages. Existing instances of an application can continue to execute even when a new version of an invoked software component (e.g., stored procedure) is released. Updated versions of software components can be installed at any time without affecting executing applications using a current version of the software component. Simultaneous availability of different versions of the same software component can eliminate downtime for the application.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

This disclosure generally describes computer-implemented methods, software, and systems for deploying updated versions of software components of application (e.g., cloud applications) without requiring down-time of the applications. For example, an application instance that is executing using a current version of the software component can continue to run even when an updated version of the same software component in installed (e.g., stored in a software components library). In some implementations, concurrent use of different versions of the same software component can be achieved by modifying invoking logic, e.g., code in the application that invokes the software component. For example, the modification can include identifying the version to be used at run-time, such as appending the version information with a name of the software component in the invoking logic.

Figure 1:
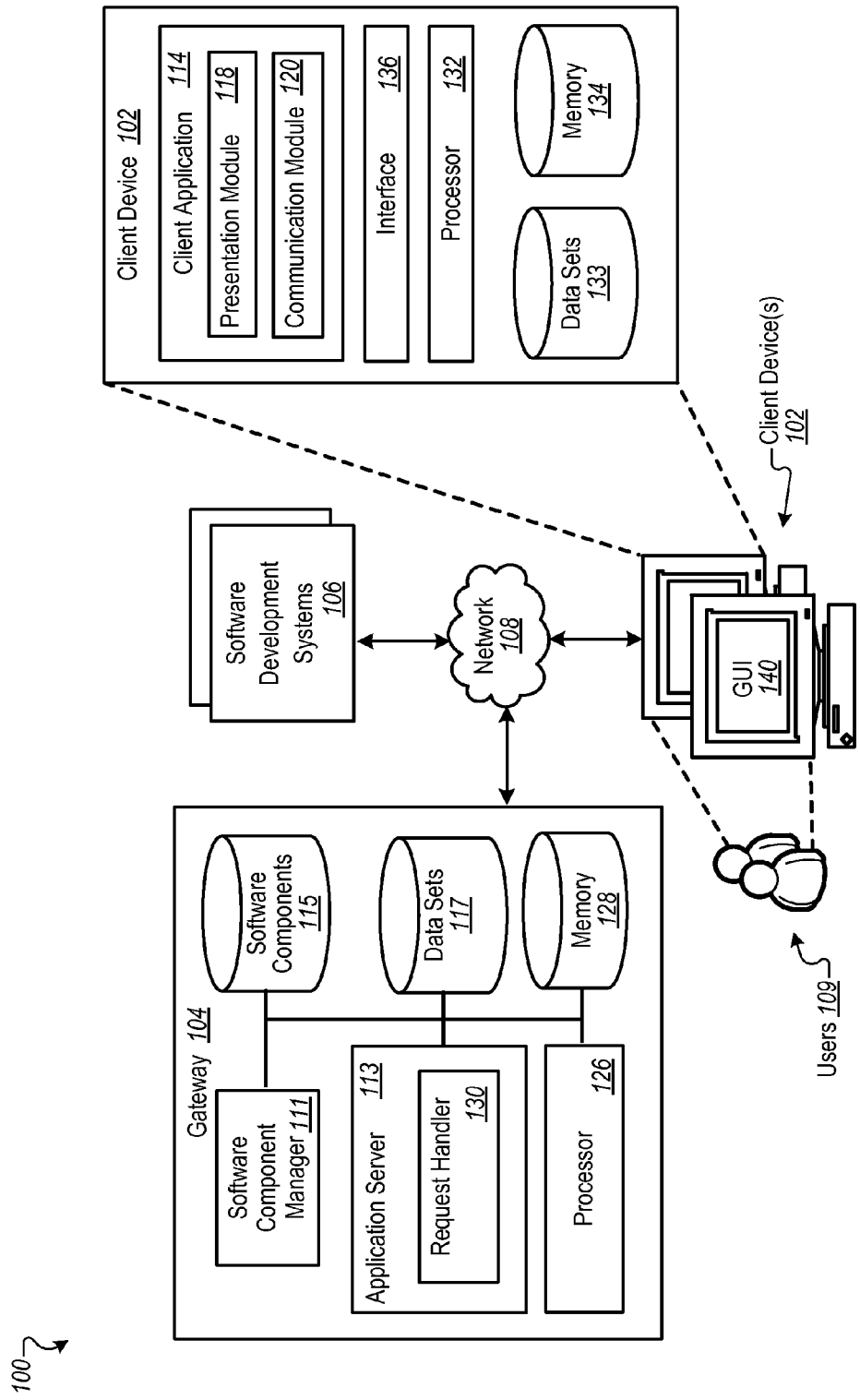
FIG. 1 is a block diagram of an example environment for deploying updated versions of software components of applications without requiring associated down-time of the applications.

FIG. 1 is a block diagram of an example environment 100 for deploying updated versions of software components of applications without requiring associated down-time of the applications. Example software components include, for example, methods, stored procedures (or other procedures), and subroutines. For example, a version can be or include one or more of a timestamp, a version number, a test/production indicator, or a development path identifier. The illustrated environment 100 includes, or is communicably coupled with, plural client devices 102, a gateway 104, and one or more software development systems 106, all connected using a network 108. For example, the environment 100 can be used to provide access, for users 109 of the plural client devices 102, to applications provided by the gateway 104. The users 109, for example, can use the client device 102 to access the gateway 104 (e.g., using a portal) and the applications provided by the gateway 104.

At a high level, the gateway 104 comprises an electronic computing device operable to store and provide access to applications for use by the client device 102. A software components library 115, for example, can include plural applications that are available through the gateway 104. The software components library 115 can also include software components (e.g., stored procedures) that are invoked by the applications. For example, the user 109 can select an interface 136 to gain access to the gateway 104. A particular application to be accessed by the user 109 can be implemented as software that uses and/or updates data stored in data sets 117, data sets 133, and/or data accessible through the network 108. Data sets 117 and 133 can include data bases that are stored or distributed in plural locations, e.g., at the client device 102, at the gateway 104, the software development systems 106, and/or other locations.

As used in the present disclosure, the term "computer" is intended to encompass any suitable processing device. For example, although FIG. 1 illustrates a single gateway 104, the environment 100 can be implemented using two or more gateways 104, as well as computers other than servers, including a server pool. Indeed, the gateway 104 may be any computer or processing device such as, for example, a blade server, general-purpose personal computer (PC), Macintosh, workstation, UNIX-based workstation, or any other suitable device. In other words, the present disclosure contemplates computers other than general purpose computers, as well as computers without conventional operating systems. Further, illustrated gateway 104 may be adapted to execute any operating system, including Linux, UNIX, Windows, Mac OS®, Java™, Android™, iOS or any other suitable operating system. According to some implementations, the gateway 104 may also include, or be communicably coupled with, an e-mail server, a web server, a caching server, a streaming data server, and/or other suitable server(s). In some implementations, components of the gateway 104 may be distributed in different locations and coupled using the network 108.

In some implementations, the gateway 104 includes an application server 113 that can process and provide access to application. For example, in response to receiving a request for an application, the application server 113 can identify, in code associated with the application, places from which particular software components are invoked/called. Before providing the code, the application server 113 can modify the code, e.g., by updating invoking logic in the code to use the most current version of a software component. Updating the invoking logic can be done, for example, by adding to invoking/calling logic information by which a current version of a software component will be invoked instead of a previous version, as described in more detail below. In some implementations, modifications can be made to the code so as to cause execution of some other specific version of a software component that may not be the most recent version. In some implementations, the gateway 104 and the application server 113 are located apart, e.g., distributed at multiple sites and connected using the network.

The gateway 104 further includes a processor 126 and memory 128. Although illustrated as the single processor 126 in FIG. 1, two or more processors 126 may be used according to particular needs, desires, or particular implementations of the environment 100. Each processor 126 may be a central processing unit (CPU), an application specific integrated circuit (ASIC), a field-programmable gate array (FPGA), or another suitable component. Generally, the processor 132 executes instructions and manipulates data to perform the operations of the client device 102. Specifically, the processor 126 executes the functionality required to receive and process requests from the client device 102.

The memory 128 or multiple memories 128 may include any type of memory or database module and may take the form of volatile and/or non-volatile memory including, without limitation, magnetic media, optical media, random access memory (RAM), read-only memory (ROM), removable media, or any other suitable local or remote memory component. The memory 128 may store various objects or data, including caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the gateway 104. In some implementations, memory 128 includes one or more of the software components library 115 (described above). Other components within the memory 128 are possible.

Each client device 102 of the environment 100 may be any computing device operable to connect to, or communicate with, at least the gateway 104 via the network 108 using a wire-line or wireless connection. In general, the client device 102 comprises an electronic computer device operable to receive, transmit, process, and store any appropriate data associated with the environment 100 of FIG. 1.

A request handler 130, e.g., included in the application server 113, can handle requests received from the client device 102. Specifically, the request handler 130 can process requests for applications received from the client application 114 (or its components 118-120). For example, a presentation module 118 can handle user interface aspects of applications that are accessed through the gateway 104. A communication module 120 can handle communication between the client application 114 and the gateway 104, for example.

The illustrated client device 102 further includes a processor 132, a memory 134, and an interface 136. The interface 136 is used by the client device 102 for communicating with other systems in a distributed environment—including within the environment 100—connected to the network 108, e.g., the gateway 104, as well as other systems communicably coupled to the network 108 (not illustrated). Generally, the interface 136 comprises logic encoded in software and/or hardware in a suitable combination and operable to communicate with the network 108. More specifically, the interface 136 may comprise software supporting one or more communication protocols associated with communications such that the network 108 or interface's hardware is operable to communicate physical signals within and outside of the illustrated environment 100.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java™, Visual Basic, assembler, Perl®, any suitable version of 4GL, as well as others. While portions of the software illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

As illustrated in FIG. 1, the client device 102 includes the processor 132. Although illustrated as the single processor 132 in FIG. 1, two or more processors 132 may be used according to particular needs, desires, or particular implementations of the environment 100. Each processor 132 may be a central processing unit (CPU), an application specific integrated circuit (ASIC), a field-programmable gate array (FPGA), or another suitable component. Generally, the processor 132 executes instructions and manipulates data to perform the operations of the client device 102. Specifically, the processor 132 executes the functionality required to send requests to the gateway 104 and to receive and process responses from the gateway 104.

The illustrated client device 102 also includes a memory 134, or multiple memories 134. The memory 134 may include any memory or database module and may take the form of volatile or non-volatile memory including, without limitation, magnetic media, optical media, random access memory (RAM), read-only memory (ROM), removable media, or any other suitable local or remote memory component. The memory 134 may store various objects or data, including caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the client device 102.

The illustrated client device 102 is intended to encompass any computing device such as a smart phone, tablet computing device, PDA, desktop computer, laptop/notebook computer, wireless data port, one or more processors within these devices, or any other suitable processing device. For example, the client device 102 may comprise a computer that includes an input device, such as a keypad, touch screen, or other device that can accept user information, and an output device that conveys information associated with the operation of the gateway 104 or the client device 102 itself, including digital data, visual information, or a graphical user interface (GUI) 140, as shown with respect to and included by the client device 102. The GUI 140 interfaces with at least a portion of the environment 100 for any suitable purpose, including generating user interface screens for selecting an algorithm and electing associated parameters. In particular, the GUI 140 may be used to view and navigate various web pages located both internally and externally to the gateway 104.

Figure 2:
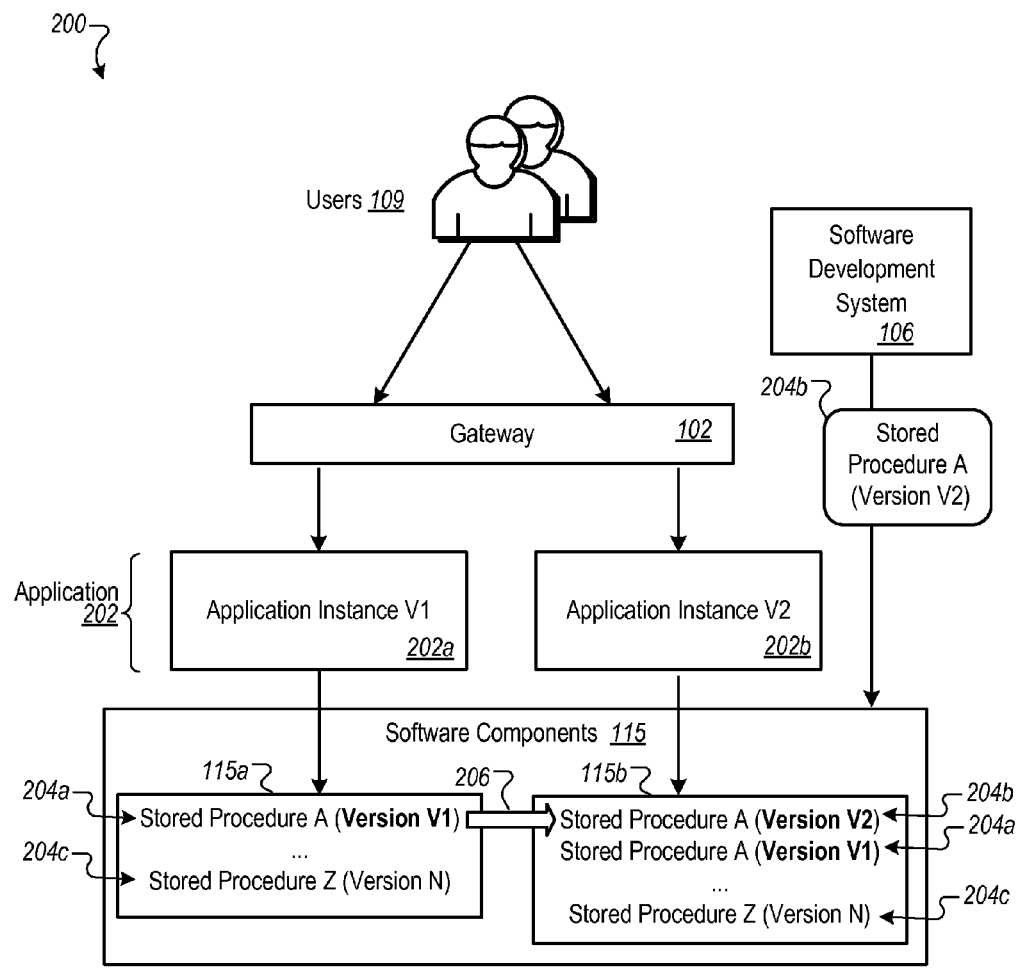
FIG. 2 is a diagram of an example version update sequence.

FIG. 2 is a diagram of an example version update sequence 200. For example, application instance V1 202a of application 202 may already be executing when software component 204b (e.g., version V2 of Stored Procedure A) is received, e.g., from a software development system 106. Application instance V1 202a is referred to here as "V1," for example, because the instance uses software component 204a (e.g., version V1 of Stored Procedure A) that is already stored in the software components library 115. As such, just prior to storage of the received software component 204b, the software components library 115 is in a state 115a. For example, the state 115a of the software components library 115 is a state in which software component 204a is the current version of Stored Procedure A, e.g., the version is to be used for new instances until yet another version is received. In the state 115a, other versions of other software components may exist, e.g., including software component 204c (e.g., version N of Stored Procedure Z).

Upon storage of the software component 204b, for example by the software component manage 111, a transition 206 can occur to the software components library 115, e.g., to a state 115b. In the state 115b, for example, software component 204b is added to the software components library 115, e.g., while software component 204a remains stored. In the state 115b, application instance V1 202a of application 202 is still allowed to run (e.g., to completion). Further, all new instances of the application 202 can be automatically configured to use, at run-time, software component 204b (e.g., version V2 of Stored Procedure A). Application instance V1 202a and application instance V2 202b may even execute simultaneously, e.g., as each application instance uses the version of Stored Procedure A for which it was intended. In some implementations, once software component 204a has no instance(s) to serve, the software component 204a can be deleted.

Figure 3:
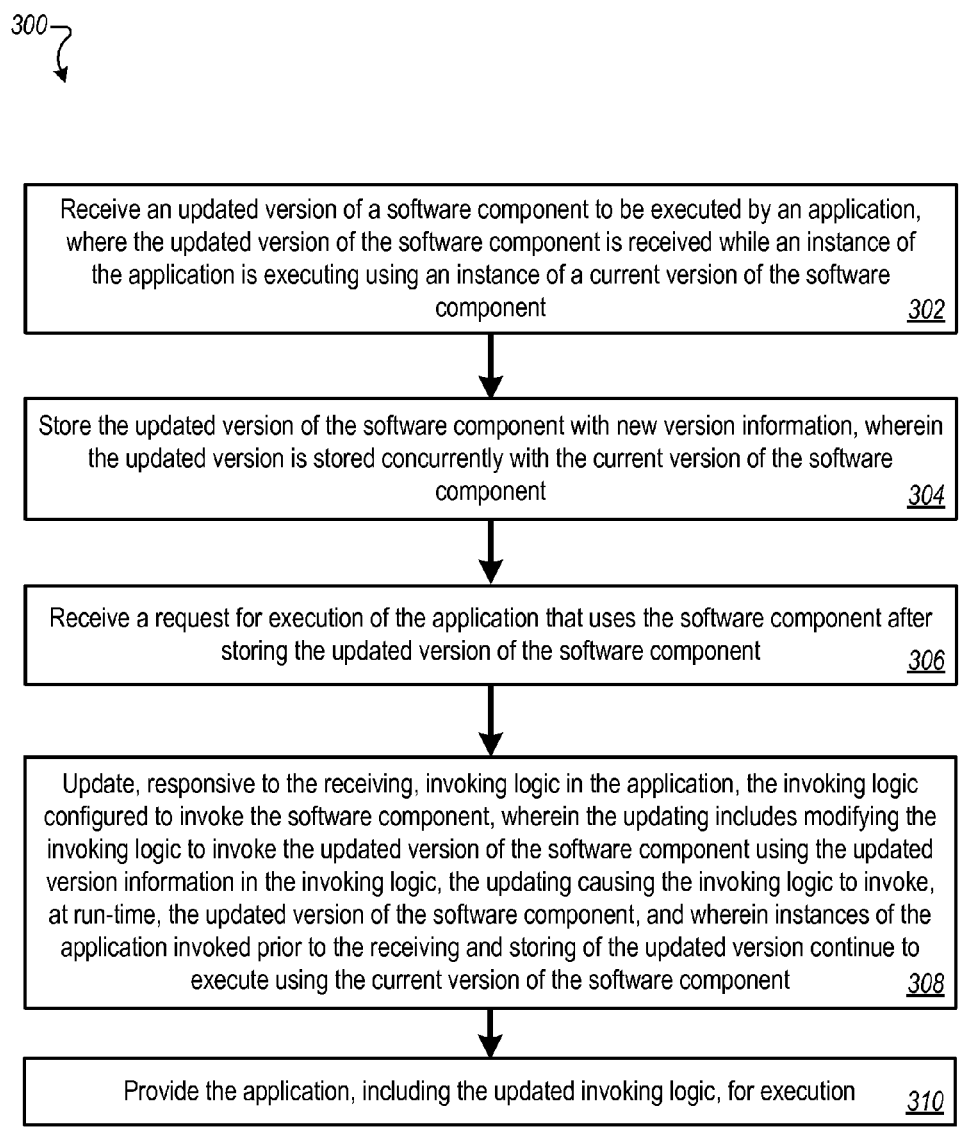
FIG. 3 is a flowchart of an example method for deploying a new version of a software component without associated downtime.

FIG. 3 is a flowchart of an example method 300 for deploying a new version of a software component without associated downtime. For clarity of presentation, the description that follows generally describes method 300 in the context of FIGS. 1-2. However, it will be understood that the method 300 may be performed, for example, by any other suitable system, environment, software, and hardware, or a combination of systems, environments, software, and hardware as appropriate. In some implementations, the gateway 104 and/or its components can be used to execute the method 300.

At 302, an updated version of a software component to be executed by an application is received, wherein the updated version of the software component is received while an instance of the application is executing using an instance of a current version of the software component. For example, at the gateway 104, the software component manager 111 can receive a new version (e.g., Version V2) of the software component Stored Procedure A. Version V2 can be a new version, for example, of the software component 204b (e.g., version V2 of Stored Procedure A). Software components can also include methods, subroutines, or other software components that may not be stored procedures. Version V2 can be received, for example, when the new version is provided by a software developer or when received from another source. At the time that Version V2 is received, for example, application instances 202a of application 202 may be executing using a current (e.g., older or previous) version (e.g., Version V1) of the software component. For example, Version V1 can be the software component 204a (e.g., version V1 of Stored Procedure A). Execution of the application instances 202a, for example, may be the result of a user selecting the application 202 for execution through the gateway 104.

At 304, the updated version of the software component is stored with new version information, wherein the updated version is stored concurrently with the current version of the software component. For example, the software component manager 111 can store Version V2 in the software components library 115, such as software component 204b. At the time of storage, Version V1 is also currently stored (e.g., stored at the time that V1 was introduced by a software developer). As such, the software component manager 111 can store additional information in the software components library 115 in order to differentiate between Versions V1 and V2. Application instances 202a can to continue to execute because Version V1 remains in storage.

In some implementations, the updated version of the software component and the current version of the software component are stored in a common database. For example, software components 204a and 204b can be stored (e.g., existing simultaneously) in the software components library 115.

At 306, a request is received for execution of the application that uses the software component after storing the updated version of the software component. For example, while both Versions V1 and V2 are stored in the software components library 115, e.g., as software components 204a and 204b, respectively, a user accessing the gateway 104 can request the application 202. An application instance 202b can be created, e.g., prepared for execution for use by the user 109.

At 308, responsive to the receiving, invoking logic in the application is updated. The invoking logic is configured to invoke the software component. The updating includes modifying the invoking logic to invoke the updated version of the software component using the updated version information in the invoking logic. The updating causes the invoking logic to invoke, at run-time, the updated version of the software component. Instances of the application invoked prior to the receiving and storing of the updated version continue to execute using the current version of the software component.

For example, the application server 113 can process code associated with the application 202, including identifying places in the code from which Stored Procedure A is invoked/called. The application server 113 can modify the code, such as by adding to invoking/calling logic information by which Version V2 will be invoked/called instead of Version V1. This can occur automatically, for example, by identifying the most recent timestamp or other indicator in the software components library 115, and adding a corresponding version indicator in the invoking/calling logic (e.g., by using a concatenation of the stored procedure name with a version indicator, or by generating a different stored procedure name). After the invoking/calling logic is updated, the application instance 202b is ready for execution, so that at runtime, Version V2 is invoked/called. This can occur, for example, while other application instances may be using old versions of the software component, e.g., application instance 202a using Version V1. As an example of software components having different names, e.g., invocation of which being made by modification of the code, Add_Widget_20150217_130000 and Add_Widget_20150317_050000 include date/time information that identifies each version's creation date. In some implementations, software components (e.g., stored in the software components library 115) can be displayed in a user interface for presentation to a software developer, such as to indicate a presence of multiple versions of the same software component.

In some implementations, updating the invoking logic includes concatenating a name of the software component with a string representing the new version information. For example, in the application 202, the format of the call to Stored Procedure A can include the stored procedure name to which a suffix is appended, e.g., that identifies an associated version. As a result, the invoking logic for application instance 202a can be something along the lines of "call A.V1( . . . )" as compared to "call A.V2( . . . )" for application instance 202b.

In some implementations, updating the invoking logic includes replacing a name of the software component in the invoking logic with a new name of the software component associated with the updated version information. For example, in the application 202, the format of the call to Stored Procedure A can include an updated stored procedure name, such to include "call A_Version2( . . . )" instead of "call A_Version2( . . . )" in the application instance 202b.

In some implementations, other scenarios can exist for updating the invoking logic, e.g., using a timestamp or other uniquely-identifying information associated with a version. In some implementations, other information in addition to version information can be concatenated (or another function used), such as a development path identifier (e.g., for a release and/or patch), and/or an indicator that specifies whether the call is productive or test (e.g., for debugging).

In some implementations, a similar type of substitution can occur for other types of software components. For example, a different version of a dataset or some other data structure can be indicated, by updating the logic, so that when the application executes, the different version of the dataset can be accessed.

At 310, the application is provided for execution, including the updated invoking logic. For example, the gateway 104 can provide the application instance 202b for execution, e.g., by the user 109.

In some implementations, the method 300 includes additional operations for purging obsolete versions. The method 300 can include, for example, determining that the instances of the application invoked prior to the receiving and storing of the updated version using the current version of the software component are no longer executing. The application server 113, for example, can determine that all application instances 202a (using Version V1) have completed execution. The method 300 can also include, for example, deleting, disabling, or archiving the current version of the software component, based on the determining. The software component manager 111, for example, can update the software components library 115 to indicate that the Version V1. Marking a version obsolete, for example, can include is deleting the version from the software components library 115, disabling the version in the software components library 115 (so the version can no longer be used), or by archiving the version (e.g., moving the version to an archive library).

In some implementations, the stored procedure has multiple versions, each version having different version information, and the method 300 further include version management. For example, the method 300 can further include managing the multiple versions of the stored procedure to prevent an occurrence of consistency issues associated with the multiple versions. As an example, the software component manager 111 can assure that different versions of the same software component (e.g., Stored Procedure A) can be used by different application instances without data or version inconsistencies occurring. The method 300 can further include supporting development of applications using a name of the software component without a developer knowledge of version information. For example, a software developer does not need to have knowledge of a versioning system that automatically handles any versions created by the software developer.

In some implementations, the software component manager 111 can wait to store (or make active) any updated version that is received, e.g., if the updated version has a corresponding effectiveness date. In this example, the updated version may be stored in the software components library 115, but the application server 113 may not use the updated version until a time is reached that the updated version is to be activated or enabled.

In some implementations, components of the environments and systems described above may be any computer or processing device such as, for example, a blade server, general-purpose personal computer (PC), Macintosh, workstation, UNIX-based workstation, or any other suitable device. In other words, the present disclosure contemplates computers other than general purpose computers, as well as computers without conventional operating systems. Further, components may be adapted to execute any operating system, including Linux, UNIX, Windows, Mac OS®, Java™, Android™, iOS or any other suitable operating system. According to some implementations, components may also include, or be communicably coupled with, an e-mail server, a web server, a caching server, a streaming data server, and/or other suitable server(s).

Processors used in the environments and systems described above may be a central processing unit (CPU), an application specific integrated circuit (ASIC), a field-programmable gate array (FPGA), or another suitable component. Generally, each processor can execute instructions and manipulates data to perform the operations of various components. Specifically, each processor can execute the functionality required to send requests and/or data to components of the environment and to receive data from the components of the environment, such as in communication between the external, intermediary and target devices.

Components, environments and systems described above may include a memory or multiple memories. Memory may include any type of memory or database module and may take the form of volatile and/or non-volatile memory including, without limitation, magnetic media, optical media, random access memory (RAM), read-only memory (ROM), removable media, or any other suitable local or remote memory component. The memory may store various objects or data, including caches, classes, frameworks, applications, backup data, business objects, jobs, web pages, web page templates, database tables, repositories storing business and/or dynamic information, and any other appropriate information including any parameters, variables, algorithms, instructions, rules, constraints, for references thereto associated with the purposes of the target, intermediary and external devices. Other components within the memory are possible.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java™, Visual Basic, assembler, Perl®, any suitable version of 4GL, as well as others. Software may instead include a number of sub-modules, third-party services, components, libraries, and such, as appropriate. Conversely, the features and functionality of various components can be combined into single components as appropriate.

Devices can encompass any computing device such as a smart phone, tablet computing device, PDA, desktop computer, laptop/notebook computer, wireless data port, one or more processors within these devices, or any other suitable processing device. For example, a device may comprise a computer that includes an input device, such as a keypad, touch screen, or other device that can accept user information, and an output device that conveys information associated with components of the environments and systems described above, including digital data, visual information, or a graphical user interface (GUI). The GUI interfaces with at least a portion of the environments and systems described above for any suitable purpose, including generating a visual representation of a web browser.

The preceding figures and accompanying description illustrate example processes and computer implementable techniques. The environments and systems described above (or their software or other components) may contemplate using, implementing, or executing any suitable technique for performing these and other tasks. It will be understood that these processes are for illustration purposes only and that the described or similar techniques may be performed at any appropriate time, including concurrently, individually, in parallel, and/or in combination. In addition, many of the operations in these processes may take place simultaneously, concurrently, in parallel, and/or in different orders than as shown. Moreover, processes may have additional operations, fewer operations, and/or different operations, so long as the methods remain appropriate.

In other words, although this disclosure has been described in terms of certain implementations and generally associated methods, alterations and permutations of these implementations, and methods will be apparent to those skilled in the art. Accordingly, the above description of example implementations does not define or constrain this disclosure. Other changes, substitutions, and alterations are also possible without departing from the spirit and scope of this disclosure.

What is claimed is:

1. A method comprising:
   receiving an updated version of a software component to be executed by an application, where the updated version of the software component is received while an instance of the application is executing using an instance of a current version of the software component;
   storing the updated version of the software component with new version information, wherein the updated version is stored concurrently with the current version of the software component;
   receiving a request for execution of the application that uses the software component after storing the updated version of the software component;
   in response to receiving the request for execution of the application that uses the software component after storing the updated version of the software component, automatically identifying the new version information of the updated version of the software component;
   automatically updating, responsive to identifying the new version information, invoking logic in the application, the invoking logic configured to invoke the software component, wherein the updating includes modifying the invoking logic to include the new version information of the updated version of the software component in the invoking logic, wherein updating the invoking logic includes concatenating a name of the software component with a string representing the new version information, the updating causing the invoking logic to invoke, at run-time, the updated version of the software component, and wherein instances of the application invoked prior to the receiving and storing of the updated version continue to execute using the current version of the software component; and
   providing the application, including the updated invoking logic, for execution.

2. The method of claim 1, wherein updating the invoking logic includes replacing a name of the software component in the invoking logic with a new name of the software component associated with the updated version information.

3. The method of claim 1, wherein the version information includes one or more of version identifiers selected from a group comprising a timestamp, a version number, a test/production indicator, and a development path identifier.

4. The method of claim 1, further comprising:
   determining that the instances of the application invoked prior to the receiving and storing of the updated version using the current version of the software component are no longer executing; and
   deleting, disabling, or archiving the current version of the software component, based on the determining.

5. The method of claim 1, wherein the software component is a stored procedure.

6. The method of claim 5, wherein the stored procedure has multiple versions, each with different version information, and wherein the method further comprises:
   managing the multiple versions of the stored procedure to prevent an occurrence of consistency issues associated with the multiple versions; and
   supporting development of applications using a name of the software component without a developer knowledge of version information.

7. The method of claim 1, wherein the software component is a method, a procedure, or a subroutine.

8. The method of claim 1, wherein the updated version of a software component and the current version of the software component are stored in a common database.

9. A system comprising:
   a memory storing:
   a software components library including information for components associated with plural applications; and
   an application for:
   receiving an updated version of a software component to be executed by an application, where the updated version of the software component is received while an instance of the application is executing using an instance of a current version of the software component;
   storing the updated version of the software component with new version information, wherein the updated version is stored concurrently with the current version of the software component;
   receiving a request for execution of the application that uses the software component after storing the updated version of the software component;
   in response to receiving the request for execution of the application that uses the software component after storing the updated version of the software component, automatically identifying the new version information of the updated version of the software component;
   automatically updating, responsive to identifying the new version information, invoking logic in the application, the invoking logic configured to invoke the software component, wherein the updating includes modifying the invoking logic to include the new version information of the updated version of the software component in the invoking logic, wherein updating the invoking logic includes concatenating a name of the software component with a string representing the new version information, the updating causing the invoking logic to invoke, at run-time, the updated version of the software component, and wherein instances of the application invoked prior to the receiving and storing of the updated version continue to execute using the current version of the software component; and
   providing the application, including the updated invoking logic, for execution.

10. The system of claim 9, wherein updating the invoking logic includes replacing a name of the software component in the invoking logic with a new name of the software component associated with the updated version information.

11. The system of claim 9, wherein the version information includes one or more of version identifiers selected from a group comprising a timestamp, a version number, a test/production indicator, and a development path identifier.

12. The system of claim 9, the application further comprising:
   determining that the instances of the application invoked prior to the receiving and storing of the updated version using the current version of the software component are no longer executing; and
   deleting, disabling, or archiving the current version of the software component, based on the determining.

13. The system of claim 9, wherein the software component is a stored procedure.

14. A non-transitory computer-readable media encoded with a computer program, the program comprising instructions that when executed by one or more computers cause the one or more computers to perform operations comprising:
- receiving an updated version of a software component to be executed by an application, where the updated version of the software component is received while an instance of the application is executing using an instance of a current version of the software component;
- storing the updated version of the software component with new version information, wherein the updated version is stored concurrently with the current version of the software component;
- receiving a request for execution of the application that uses the software component after storing the updated version of the software component;
- in response to receiving the request for execution of the application that uses the software component after storing the updated version of the software component, automatically identifying the new version information of the updated version of the software component;
- automatically updating, responsive to identifying the new version information, invoking logic in the application, the invoking logic configured to invoke the software component, wherein the updating includes modifying the invoking logic to include the new version information of the updated version of the software component in the invoking logic, wherein updating the invoking logic includes concatenating a name of the software component with a string representing the new version information, the updating causing the invoking logic to invoke, at run-time, the updated version of the software component, and wherein instances of the application invoked prior to the receiving and storing of the updated version continue to execute using the current version of the software component; and
- providing the application, including the updated invoking logic, for execution.

15. The non-transitory computer-readable media of claim 14, wherein updating the invoking logic includes replacing a name of the software component in the invoking logic with a new name of the software component associated with the updated version information.

16. The non-transitory computer-readable media of claim 14, wherein the version information includes one or more of version identifiers selected from a group comprising a timestamp, a version number, a test/production indicator, and a development path identifier.

17. The non-transitory computer-readable media of claim 14, the application further comprising:
- determining that the instances of the application invoked prior to the receiving and storing of the updated version using the current version of the software component are no longer executing; and
- deleting, disabling, or archiving the current version of the software component, based on the determining.

* * * * *